I. J. HOLLENSBE.
AUTOMATIC CARRIER FOR FEEDING BROOM MACHINERY.
APPLICATION FILED DEC. 9, 1915.

1,266,947.

Patented May 21, 1918.
5 SHEETS—SHEET 1.

WITNESSES:
Paul E. Krier
George H. Lahr

INVENTOR
Ira J. Hollensbe,

BY
A. H. Howland Thoreau ATTORNEY

I. J. HOLLENSBE.
AUTOMATIC CARRIER FOR FEEDING BROOM MACHINERY.
APPLICATION FILED DEC. 9, 1915.
Patented May 21, 1918.
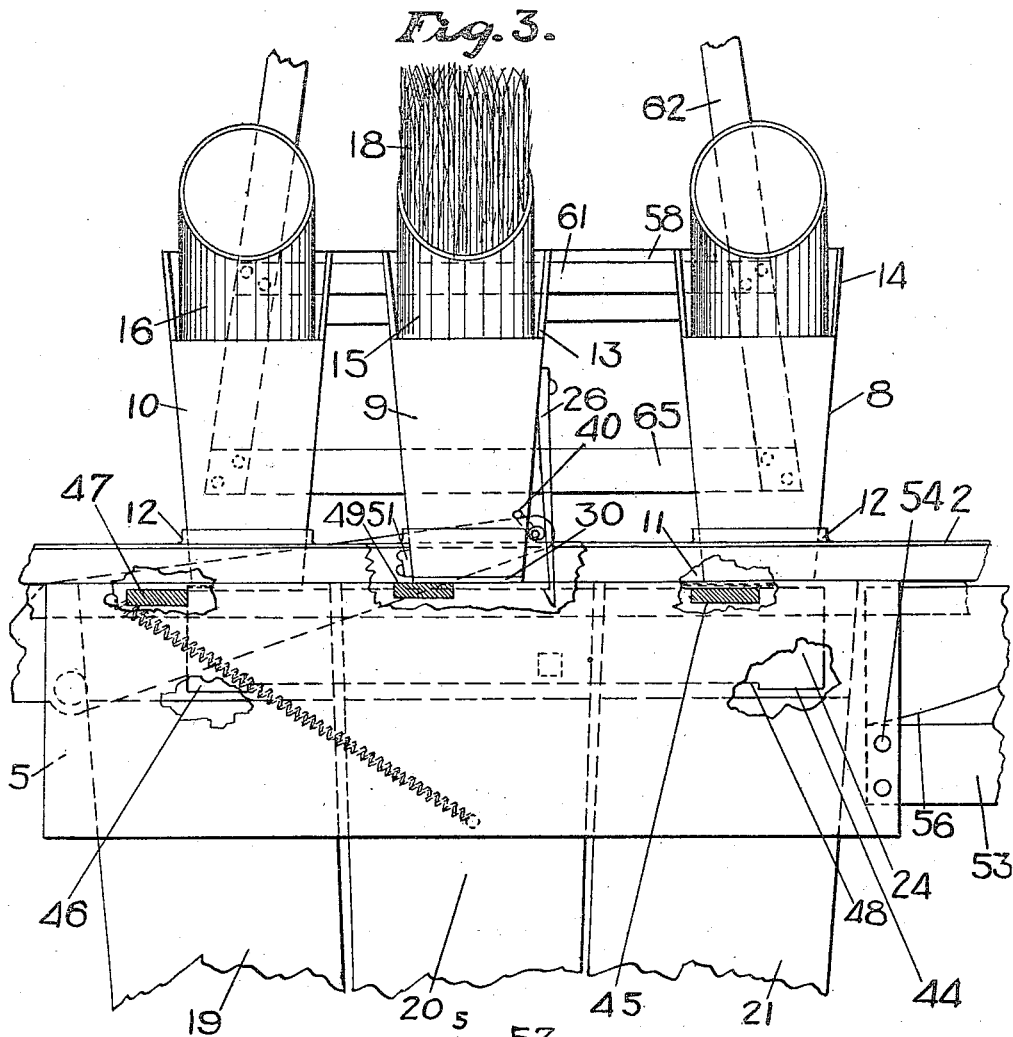
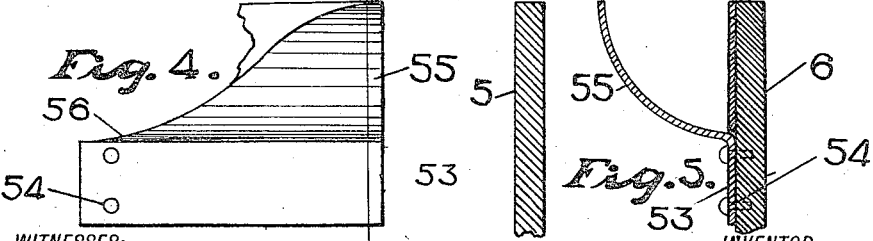

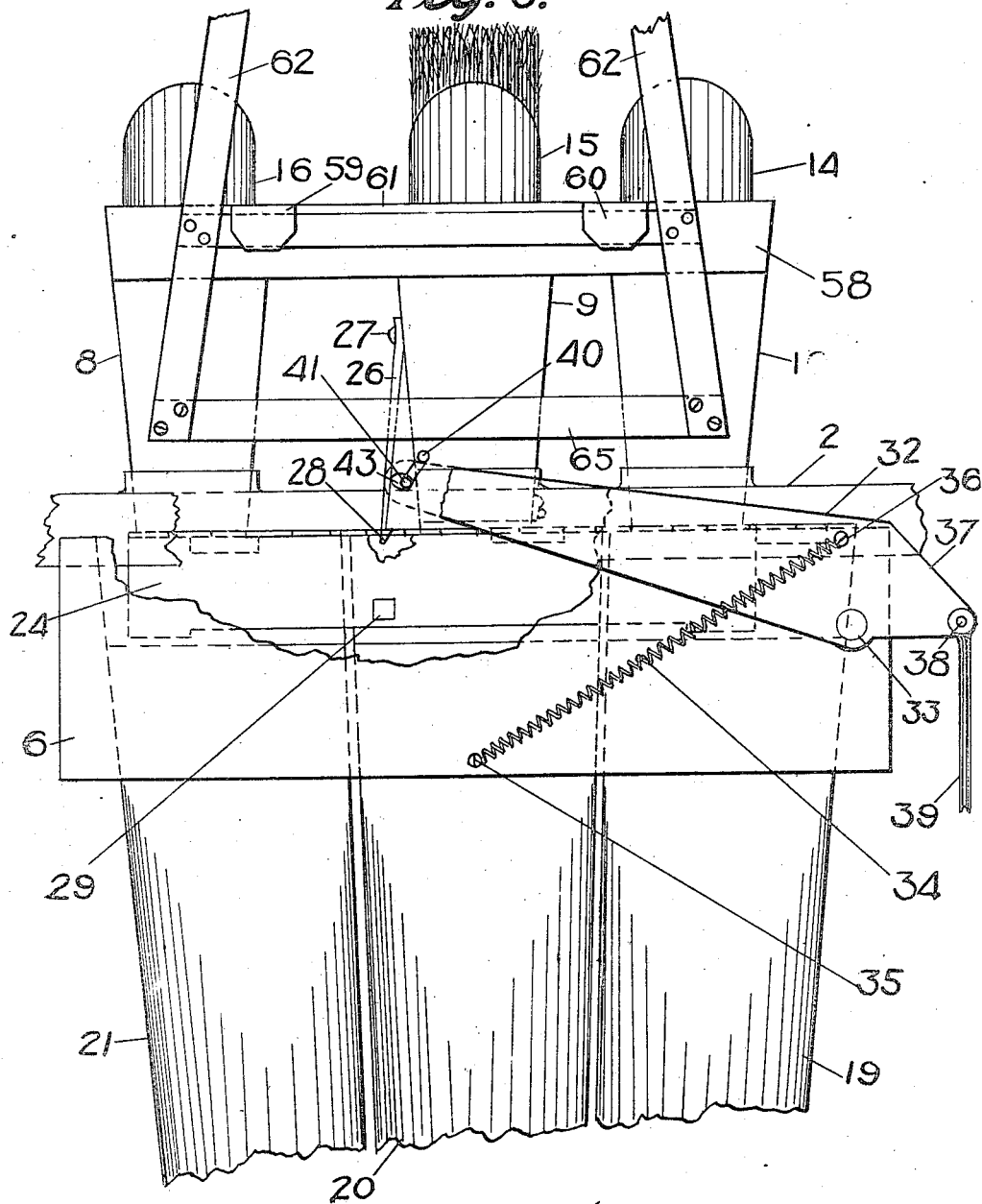

I. J. HOLLENSBE.
AUTOMATIC CARRIER FOR FEEDING BROOM MACHINERY.
APPLICATION FILED DEC. 9, 1915.
1,266,947.
Patented May 21, 1918.
5 SHEETS—SHEET 4.
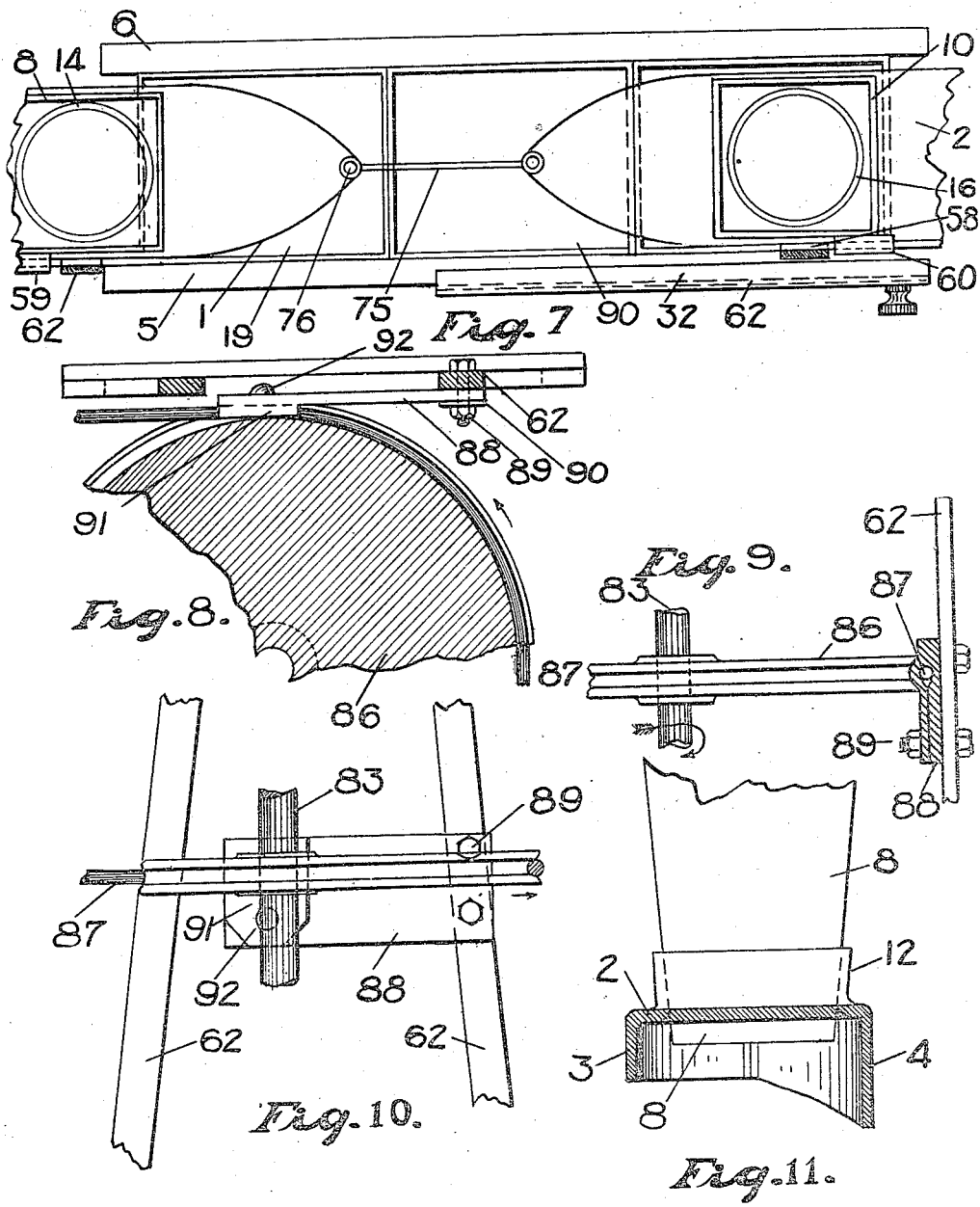
WITNESSES:
Paul E. Krier
George W. Lahr
Ira J. Hollensbe, INVENTOR
BY
A. H. Howland Shearman, ATTORNEY I. J. HOLLENSBE.
AUTOMATIC CARRIER FOR FEEDING BROOM MACHINERY.
APPLICATION FILED DEC. 9, 1913.

1,266,947.

Patented May 21, 1918.
5 SHEETS—SHEET 5.

WITNESSES:
Paul E. Krier
George W. Lahr

INVENTOR
Ira J. Hollensbe,
BY
N. Harland Shearman
ATTORNEY

UNITED STATES PATENT OFFICE.

IRA J. HOLLENSBE, OF GREENSBURG, INDIANA, ASSIGNOR, BY DIRECT AND MESNE ASSIGNMENTS, TO THE UNITED BROOM COMPANY, OF KOKOMO, INDIANA, A CORPORATION OF MAINE.

AUTOMATIC CARRIER FOR FEEDING BROOM MACHINERY.

1,266,947. Specification of Letters Patent. Patented May 21, 1918.

Application filed December 9, 1915. Serial No. 65,912.

*To all whom it may concern:*

Be it known that I, IRA J. HOLLENSBE, a citizen of the United States, residing at Greensburg, in the county of Decatur and State of Indiana, have invented a certain new and useful Improvement in Automatic Carriers for Feeding Broom Machinery, of which the following is a specification.

My invention is designed to furnish a mechanism for carrying and automatically delivering to broom-machinery the materials from which brooms are made by such machinery, and has for its objects: first, to supply a device multiple units of which are capable of being driven by a single motive power in an endless chain, so as to automatically discharge in series by machanical selection to one or more broom machines conveniently located with respect to the circuit of such endless chain; 2nd, to furnish an automatic carrier capable of carrying in multiple hoppers determinate quantities of different materials requisite for delivery to a broom machine for integration to form the required composition of the broom; and 3rd, to supply means for interchangeably nesting such hoppers to accommodate the greater or less quantities required in various sizes of brooms and mechanism for causing the mechanical delivery of the materials to the broom-machinery in an accurate manner which eliminates the casual waste incident to manual delivery.

I attain these objects by means of the construction illustrated in the accompanying drawings, in which—

Figure 1:
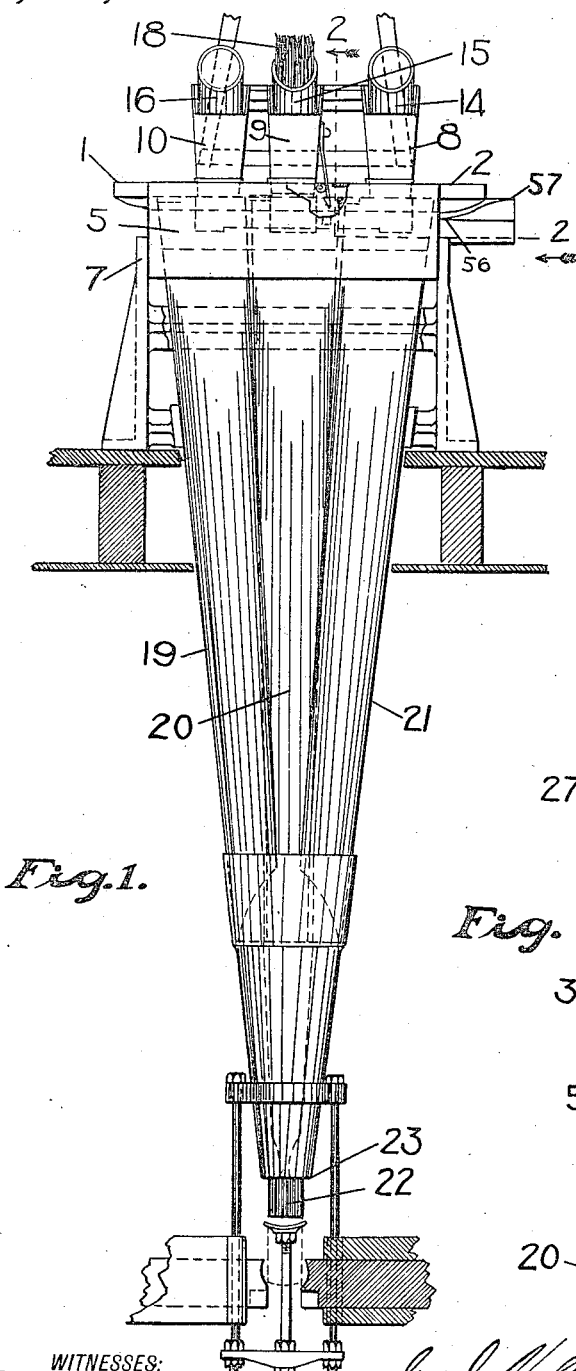
Figure 2:
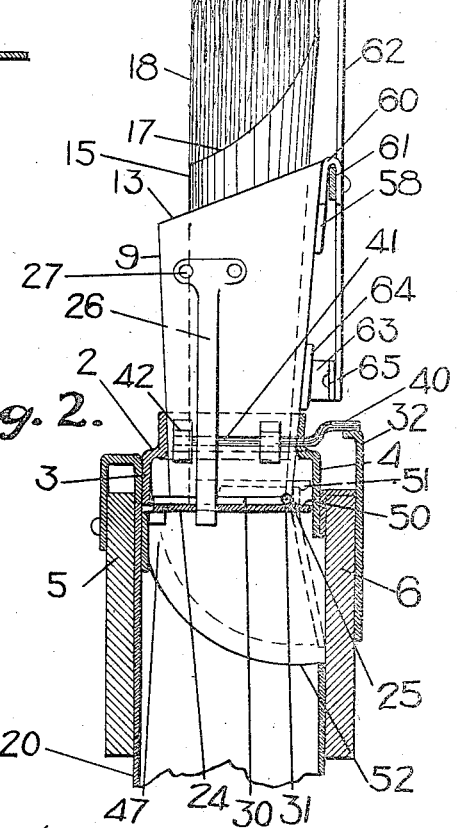
Figure 12:
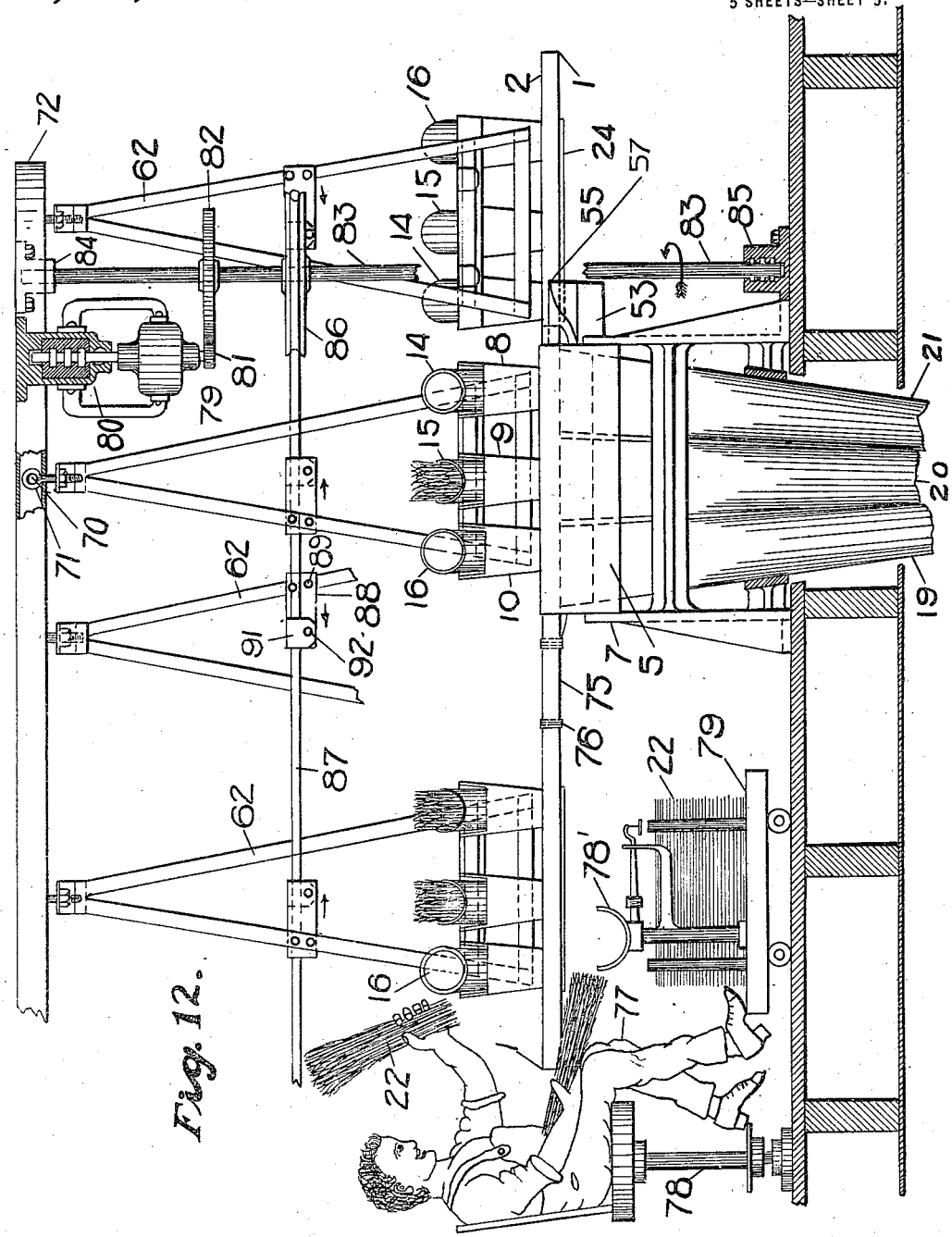

Figure 1 gives a view of one of my carriers of the triple-hopper type passing over a pneumo-gravitational broom assembler, into which two of the hoppers of said carrier have been discharged and a third is about to be discharged, and shows a portion of a broom press at the bottom of said assembler; Fig. 2 is an enlarged interior sectional elevation taken on the line 2—2, Fig. 1, looking in the direction of the arrows, showing the same carrier as in Fig. 1 with the front hopper removed to reveal the construction of the middle hopper, and with the carrier frame, carrier track and top of said assembler shown in section; Fig. 3 is an enlarged front elevation of the same automatic carrier depicted in Fig. 1, showing the mechanical attachments on said assembler adapted to release the contents of said carrier; Fig. 4 is a front elevation and Fig. 5 is a section on the line 5—5, Fig. 4, looking in the direction of the arrows, showing a helical trap closer, adapted to automatically close the floor traps of said automatic carrier after discharge thereof; Fig. 6 is an enlarged rear elevation of the same automatic carrier depicted in Fig. 1, showing the devices secured to the back of said assembler for causing the discharge thereinto of the contents of said carrier; Fig. 7 is an enlarged top plan view to indicate the method of linking together my carriers, parts of two of which are shown passing through the top of the assembler of the type shown in Fig. 1; Fig. 8 is an enlarged partly sectional top plan view of a fragment of the cable pulley and cable used to drive my chain of carriers, showing the frame of one of said carriers attached to said cable; Fig. 9 is a partly sectional end view of the same cable pulley, cable and carrier attachment shown in Fig. 8; Fig. 10 is a fragmentary side elevation of the same cable pulley, cable, and carrier frame attachment shown in Fig. 8; Fig. 11 is a partly sectional fragmentary elevation of one of the hoppers of my automatic carrier; and Fig. 12 is a front elevation of a part of a plant showing several of my carriers in operation to supply an assembler of the same type shown in Fig. 1, one of said carriers being represented as having just emptied into the assembling machine, another in the act of emptying into same, and the third approaching carrier having its last hopper filled by a workman as it passes his station in the carrier circuit.

Similar numerals refer to similar parts throughout the several views.

Referring to Figs. 1, 2 and 3, 1 is the carrier base, preferably constructed from heavy sheet metal as an inverted hollow body from whose top 2 a shorter guide flange 3 depends from the front side and a longer guide flange 4 depends from the rear side, the object of said dependent guide flanges being to guide the carrier 1 through the guide-way sides as 5 and 6 of a machine such as the pneumo-gravitational assembler 7, into which said automatic carrier may be arranged to discharge its materials.

In the form of my invention illustrated in the drawings the plurality of hoppers is fixed at three, to be adapted to the number of kinds of materials required to be discharged in the particular type of assembler 7 shown, but such number of hoppers may be any suitable number corresponding to the number of kinds of materials to be delivered at each unit discharge by my carriers. The forward, middle and rear hopper holders 8, 9 and 10, are secured through holes, as 11, in the base top 2 by upturned rectangular flanges 12 made from portions of the material cut away for said holes 11, as clearly indicated in Fig. 3. Said hopper holders are preferably made like inverted truncated pyramids but with the tops having frontward sloping edges as at 13, Fig. 2, to better permit the easy introduction within the respective holders of the interchangeable conical hoppers 14, 15 and 16, likewise having forwardly sloping tops as at 17, Fig. 2, for permitting quick introduction to said hoppers of the material 18 thereto.

The particular form of my invention shown in the drawings is adapted to serve a broom assembler like 7 in Fig. 1, whose three tubes 19, 20 and 21 correspond in number to the carrier hoppers, and the forward hopper 14 and rear hopper 16 are intended to be used for the carriage and delivery to the outer tubes 19 and 21 of said assembler 7 of the fine hurl 22 which is shown as just having been emitted through the terminal 23 of said assembler, while the coarser filler material 18 is intended to be carried in the middle hopper 15 for delivery to the middle tube 20 of said assembler, but it will be evident that where any different number of materials is to be similarly delivered for composite use or mixture, the number of hoppers in my carrier can be correspondingly increased or decreased without changing its mode of operation.

The mechanism by which my automatic carrier is made to hold or to discharge its load is clearly indicated in Figs. 2, 3 and 6. In this type of my carrier it is desired that the first and last hoppers shall discharge prior to the middle one,—hence a floor trap 24 is used common to all the hoppers 14, 15 and 16 and is sustained upon a hinge 25 running continuously along the lower bottom edges of the hopper holders 8, 9 and 10. A spring catch 26 secured by rivets 27 to the middle hopper holder engages with its ratchet 28 the edge of the aperture 29 in said floor trap 24, thus holding said floor trap up so as to keep closed the mouths of the outer hoppers 14 and 16 and supporting on the top of said floor trap the filler trap 30 secured by the hinge 31 to the rear edge of the middle hopper holder 9 in such manner as to also keep closed the middle hopper 15, whose mouth opens commonly with that of said holder.

While any efficient device may be employed to cause the automatic release of my carrier and the discharge of its load into the machine it is used to serve, I prefer the mechanism shown in Figs. 2, 3 and 6, for the reason that it causes the release of the carrier 1 by a positive act from the operator and permits the carrier to pass with its load retained whenever an accidental necessity arises for omitting a discharge at the machine served. In this release mechanism the release plane 32 is secured by a pivot 33 on the rear guide as 6, of the machine into which the carrier is to empty, said plane being normally kept down out of engagement with the carrier by the tension spring 34 secured by the pin 35 to said guide-way and by the pin 36 to said release plane. The short arm 37, having secured thereto by the pin 38 the pedal link 39, a very short pull on the latter by the operator suffices to raise the release plane 32 so that on the next carrier approaching it will engage with and lift the crank 40 on the cam shaft 41 journaled in the bearings 42 on the middle hopper 9 and thereby rotate the cam 43 against the inner face of the spring catch 26 so as to release said catch from engagement with the edge of the aperture 29, permit its ratchet 28 to pass through said aperture and the floor trap 24 to drop for a short distance until the trap ear 44 rests on the time slide 45 and the trap ear 46 rests on the time slide 47, as in Fig. 3, over which slides said trap ears slide until the trap ear 46 drops off the edge of the time slide 47 and simultaneously the trap ear 44 drops off the time slide 45 when the recess 48 in its front edge permits said floor trap 24 to fall from said sides and discharge the contents of the end hoppers 14 and 16. Fig. 3 shows how said time slides 45 and 47 are secured preferably to the front guide-way 5 of the machine to be served by the carrier and how, after the release of the floor trap 24, the filler trap 30 continues to rest on the middle time slide 49 whose length is preferably such that said filler trap continues to slide over said middle time slide and only escapes therefrom after the hurl from the end hoppers as at 22, Fig. 1, has been quite discharged, when the filler contents 18 of the middle hopper 15 is adapted to be released by the dropping of said filler trap 30 off of said time slide 49 and completing the emptying of the carrier.

Fig. 2 clearly shows how the dog 50 projecting integrally from the rear edge of the floor plate 24 is adapted to be engaged by the spring detent 51 secured on the hopper holder 9 so as to prevent rebound of the floor trap as it falls open, and how the tops of the hollow receiving members as 20 of the machine served have sectors 52 cut therefrom to permit the free dropping and passage of said floor trap.

Figs. 3, 4, 5 and 12 show the helical closer which I prefer to use for closing my automatic carrier after it has discharged its contents into a machine. A bracket 53 is secured by rivets as 54 to the rear guide-way as 6 of the machine served and has integrally formed upon same the helical plate 55 whose lower point 56 is adapted to engage behind the floor trap 24 when in the dependent position shown by the dotted lines in Fig. 2, and to lift said floor trap by the transit of the carrier over said helical plate 55 until, as it reaches the summit 57 thereof it has completely raised upon the top of said floor plate the filelr trap 30 and, the crank 40 having previously escaped from the release plane 32, said floor trap is locked in its upper position by engagement therewith of the spring catch 26, causing the carrier to leave the machine closed and ready for refilling, as shown by the carrier at the right of Fig. 12.

Figs. 2, 3 and 6 show how the carrier is constructed so as to be quickly applicable to or removable from the endless chain of carriers being operated. The hopper holders 8, 9 and 10 are rigidly integrated by the hanger bar 58 provided with the integral hooks 59 and 60 adapted when hooked over the bracket bar 61 on the suspension frame 62 to support the carrier in transit, and the carrier is kept from oscillating by small brackets 63, whose inner flanges 64 are secured to the rear walls of the hopper holders 8 and 10, and whose outer ends impinge against the inside of the base bar 65 which stiffens the bottom of the suspension frame 62. The top ends of the suspension frame 62 are integrated by rivets 66 to the angle 67, through the top of which is secured the swivel bolt 68, at the top of which the swivel 69 engages the T-axle 70 having journaled at the ends thereof the suspension rolls 71 riding within the flanges of the split rollway 72 secured to the ceiling rafters 74 of the shop.

Figs. 7 to 10 inclusive, with Fig. 12, show the method of linking my carriers together, actuating the endless chain of same and manually filling the carriers. Links 75 on hinges 76 join together the carriers 1 in an endless chain, the pins of said hinges being instantly removable when an exchange of carriers is desired. A workman 77 is shown seated on a stool 78 adjacent to a truck 79 from which he is loading the filler 22 into the rear hoppers 16 of the carrier, as each of said hoppers passes his station, such loading being his only duty, while similar workmen are similarly engaged with loading the remaining hoppers thereof. For high-speed carrier service I prefer to employ about nine of the carriers in the endless chain, and organize my workmen in three crews of three each, by which arrangement each workman has only to fill his particular hopper in every third carrier that passes, which gives him time to work with great deliberation, occasionally weighing the charge on the scale 78', and still permits driving the carrier chain steadily at a relatively considerable speed, which is important when the assembler 7 is operated in connection with a high-speed automatic broom press.

My chain of carriers is preferably driven by a vertical aerial motor 79 suspended from the factory ceiling by the thrust bracket 80 and engaging by its pinion 81 the large gear 82, by varying the diameter of which the speed of the carrier system can be maintained at any rate desired for the particular service.

The gear 82 is keyed on a vertical shaft 83 journaled at its top in the bearing 84 and stepped at its bottom in the thrust block 85, which shaft has keyed thereon below said gear the grooved cable pulley 86, whose method of engagement with the endless cable 87 is especially clear from Figs. 8, 9 and 10. Flexible leather cable grips 88 are secured at one end by bolts 89 passing through washers 90, to the suspension frame 62 and are each provided at the opposite end with broad integral flaps 91 bent over the cable 87 and tightly secured thereto by rivets 92.

The operation of my invention will be sufficiently evident from the above description of its several parts and their mutual functions.

Having thus described my invention what I claim and desire to protect by Letters Patent is:

1. Combined in an automatic carrier, a plurality of hoppers adapted to simultaneously convey separate charges of different materials; and automatic members comprising a spring-catch and cam release adapted to cause, at a determinate place in the conveying travel of said carrier, the common discharge of said hopper charges thereof.

2. Combined in an automatic carrier, a plurality of hoppers adapted to simultaneously convey separate charges of different materials, automatic members comprising a spring-catch and cam release adapted to cause at a determinate place in the conveying travel of said carrier, the discharge of the hopper charges of a part of said hoppers; and automatic members adapted to cause at a place selected after said determinate place in said conveying travel of said carrier, the discharge of the hopper charges of the undischarged hoppers thereof.

3. Combined in an automatic carrier, a frame adapted to support said carrier; a flanged hollow base having holes; a plurality of open-bottomed hopper-holders, secured in said base holes and to said frame; a plurality of open-bottomed hoppers fitted within said hopper-holders and opening downwardly commonly through the respective mouths thereof; a floor-trap hinged to the respective end hoppers, adapted to keep same closed commonly and to hold closed a superimposed filler-trap hinged to the intermediate hopper; a spring-catch secured to one of said hopper-holders adapted to lock closed said floor-trap; a cam shaft secured to the last-named hopper-holder having a crank and provided with a cam adapted to release said spring-catch; a release-plane secured at a fixed point interrupting the travel of said carrier, adapted by actuation of said crank to release said floor-trap; floor trap time-slides fixed at points interrupting said carrier travel adjacent to said release-plane, adapted to slidably support thereon said floor-trap and to drop same for emptying the end hoppers of said carrier at a determinate point in said travel; a filler-trap time-slide secured at a point in said travel intermediate to said floor-trap time-slides, adapted to slidably support said filler-trap subsequent to said dropping of said floor-trap and to subsequently drop said filler-trap for the discharge of the contents of said intermediate hopper subsequent to said discharge of said end hoppers; a helical trap-closer secured at a point interrupting said carrier travel after the points of said securement of said time-slides, adapted to lift and latchedly close said floor-trap and filler-trap as said carrier passes over said trap-closer; swivel-rolls on said frame for engaging a track adapted to support said carrier in transit; and links on said carrier adapted to articulate same with adjacent carriers to form an endless circuit thereof.

In witness whereof, I have hereunto subscribed my name at Indianapolis, State of Indiana, this 3rd day of December, 1915.

IRA J. HOLLENSBE.

Witnesses:
P. E. KRIER,
R. GARDNER.

Copies of this patent may be obtained for five cents each, by addressing the "Commissioner of Patents, Washington, D. C."